United States Patent [19]

Boxmeyer

[11] Patent Number: 4,514,447
[45] Date of Patent: Apr. 30, 1985

[54] INFLATABLE STRUCTURAL COLUMN

[76] Inventor: James G. Boxmeyer, 512 S. 47th St., Philadelphia, Pa. 19143

[21] Appl. No.: 592,615

[22] Filed: Mar. 23, 1984

[51] Int. Cl.³ .............................................. F16L 55/12
[52] U.S. Cl. ...................................... 428/36; 428/109; 138/93
[58] Field of Search ..................... 428/109, 36; 138/93; 52/2; 244/119, 123, 146

[56] References Cited

U.S. PATENT DOCUMENTS

| | | | |
|---|---|---|---|
| 2,191,374 | 2/1940 | Dixon | 138/119 |
| 2,678,666 | 5/1954 | Theis et al. | 138/93 |
| 3,138,506 | 6/1964 | Ross | 244/123 |
| 3,364,632 | 1/1968 | Isaac | 138/119 |
| 3,962,506 | 6/1976 | Dunahoo | 244/123 |
| 4,079,755 | 3/1978 | VanderLans | 138/93 |

Primary Examiner—John E. Kittle
Assistant Examiner—James J. Seidleck

[57] ABSTRACT

A lightweight, inflatable structural member, having a substantially tubular shape and sealed at both ends, includes an inner lining to maintain internal pressure upon inflation. The inner lining is covered with a filament reinforced matrix structure comprising resin impregnated filaments of high tensile strength. The uninflated structural member is stowable in a collapsed condition. Curing of the resin matrix is inhibited by storing the collapsed member at a low temperature. Prior to use, the member is inflated with a fluid and heated to enable curing of the resin matrix.

14 Claims, 7 Drawing Figures

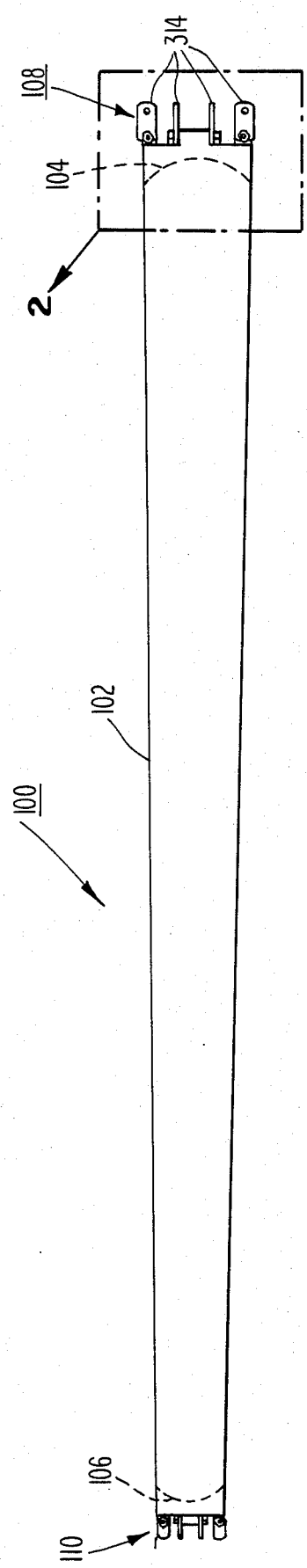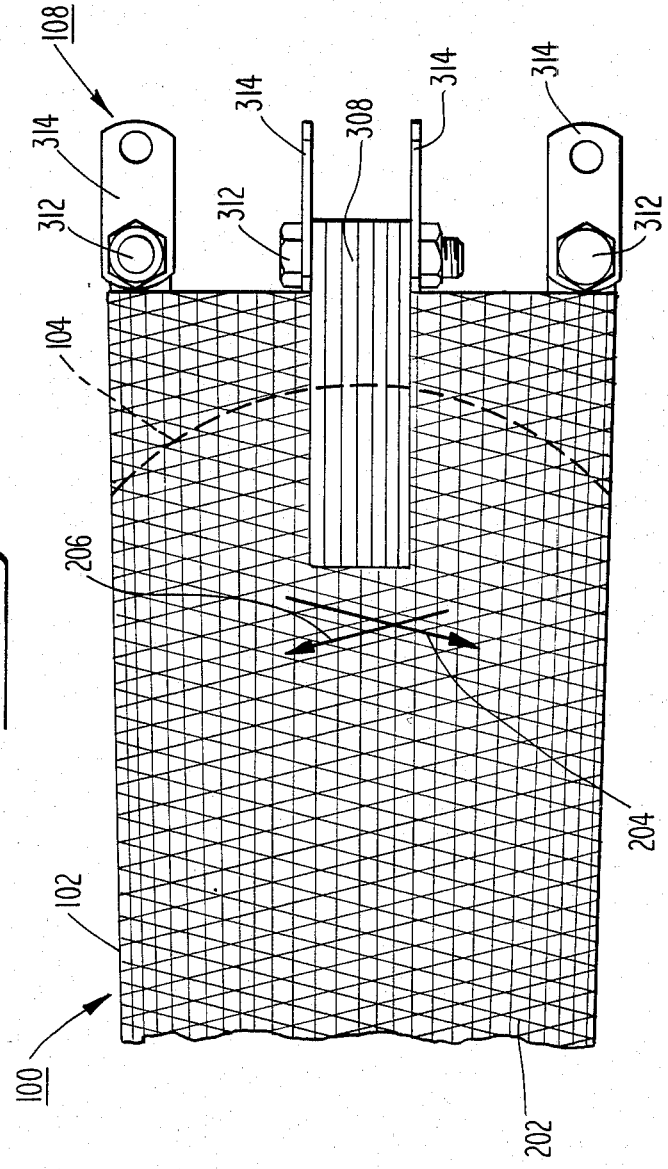
Fig. 1
Fig. 2

INFLATABLE STRUCTURAL COLUMN

BACKGROUND OF THE INVENTION

This invention relates to structural columns and more particularly to light weight, inflatable pneumatic structural columns which are erectable by internal pressurization.

Previously, inflatable structural members, constructed of a permanently flexible casing utilizing elastomeric materials such as synthetic rubber, have been proposed. These members are storable in a collapsed condition and are subsequently stiffened by inflation. However, such members lose their shape and stiffness and may even collapse upon leakage or exhaust of the inflating medium. In addition, due to the nature of the flexible material used, the inflated members, while relatively stiff, suffer from reduced strength and resistance to torsional and/or bending forces. Attempts to increase the torsional and bending strengths, by increasing the thickness of the casing material of such inflatable members, are met with detrimental increases in weight.

Another type of structural member constructed of resin impregnated unidirectional filaments has been proposed to alleviate the problems of reduced strength and resistance to torsional and/or bending forces. Such members, however, engendered yet another problem in that, since they were preformed, they occupied a relatively large volume of storage space. Attempts at solving this further problem included the fabrication of tapered half-columns which could be stored in nested form. Although this eased the storage problem somewhat, such construction complicated the structural erection since twice as many inter columnar connections are required.

Consequently, it is desirable to provide a light weight, structural column having superior strength characteristics which is storeable in compact form.

SUMMARY OF THE INVENTION

The aforementioned needs are met by the present invention which comprises a light weight, inflatable structural member, of substantially tubular shape, sealed at both ends, and which includes an inner lining to maintain internal pressure upon inflation. The inner lining is covered with a filament reinforced matrix structure comprising resin impregnated filament of high tensile strength. The uninflated structural member is stowable in a collapsed condition. Curing of the resin matrix is inhibited by storing the collapsed member at or below approximately 0° centigrade. Prior to use, the member is inflated with a fluid and heated to enable curing of the resin matrix.

Accordingly, it is an object of the present invention to provide a light weight, inflatable structural member having improved strength characteristics.

It is a further object of the present invention to provide a light weight, inflatable structural member which is storable in a collapsed condition, thereby reducing storage space requirements.

It is yet another object of the present invention to provide a light weight, inflatable structural member which remains rigid after inflation and will not lose shape or collapse upon leakage or exhaust of the inflating medium.

The features of the invention believed to be novel are set forth with particularity in the appended claims. The invention itself, both as to its organization and operation, together with further objects and advantages thereof, may best be understood by reference to the following description taken in conjunction with the accompanying drawing.

DESCRIPTION OF THE DRAWING

FIG. 1 is a side elevational view of an inflated structural column in accordance with the present invention.

FIG. 2 is an enlarged view of that portion of FIG. 1 included within rectangle.

DETAILED DESCRIPTION OF THE PREFERRED EMBODIMENT

Figure 3:
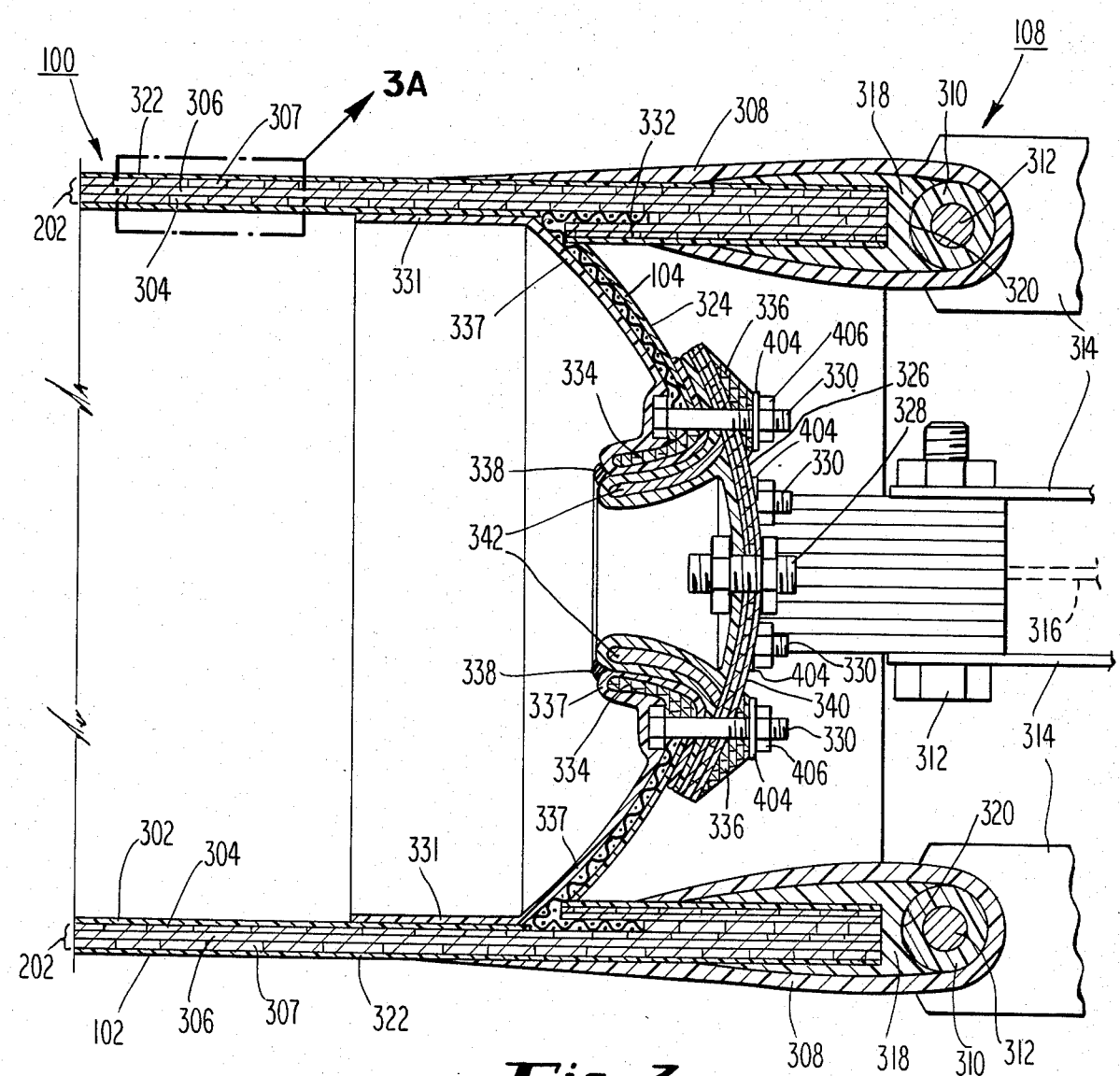
FIG. 3 is a cross-sectional, elevational view of FIG. 2.

Referring to FIG. 1, there is shown, in inflated configuration, a preferred embodiment of a structural member, generally referred to as 100, in accordance with the present invention. The structural member 100 preferably comprises a tubular body 102 having a first end cap 104 enclosing one end thereof and a second end cap 106 enclosing the opposite end. Although FIG. 1 depicts the tubular body 102 having a tapered shape, the body may also be constructed in tubular form having a constant diameter.

A first inter-column connecting assembly, generally designated 108, is attached to one end of the tubular body 102. A second inter-column connecting assembly, generally designated 110, is attached to the other end of the tubular body 102. The preferred embodiment of the connecting assemblies 108 and 110, as well as the mounting details, will be subsequently discussed in conjunction with FIG. 3.

Referring now to FIG. 2, there is shown an enlargement of the end of the structural member 100 enclosed within rectangle of FIG. 1. As shown in FIG. 2, the outer layer of the tubular body 102 is preferably covered by a filament core 202. The filament core 202 comprises alternate, spirally wound filament layers having a longitudinal layer interspersed therebetween. The spiral windings are preferably alternately wrapped in first and second directions indicated by arrows 204 and 206 respectively, with alternate layers intersecting each other in an angle of approximately 90° to 105° from the longitudinal axis. The filaments preferably comprise duPont Kelvar "49" brand aromatic polyamide fibers.

Figure 3A:
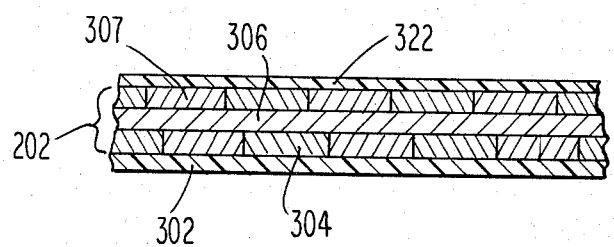
FIG. 3A is an enlarged view of that portion of FIG. 3 included within rectangule 3A.

Referring now to FIG. 3, there is shown a cross-sectional view of that portion of the structural member depicted in FIG. 2. As shown in FIG. 3, and enlarged in FIG. 3A, in addition to the outer layer constructed of the longitudinal and spirally wound filaments 202, the tubular body 102 comprises a thin, light weight, pressure tight, dimensionally stable liner 302. This liner is preferably constructed of rubberized Kevlar "49" fabric or rubberized nylon fabric. In the preferred embodiment, the liner 302 is covered by a filament core 202 which comprises a first layer of filaments 304 spirally wound in the first direction 204 (see FIG. 2): a second layer of longitudinal filaments 306 which are oriented in a direction substantially parallel to the longitudinal axis of the member 100; and a third layer of filaments 307 which are spirally wound in the second direction 206.

It is preferred that the tubular body 102 is constructed using a mandrel of appropriate shape, whether cylindrical, tapered or other varying proportions as suitable to a particular end use. The mandrel may be inflatable or rigid but should be sufficiently collapsible to permit removal once the wrapping and/or layering of material is completed. To construct the tubular body 102, it is preferred that the inner liner 302 be fitted onto the mandrel. Next, the inner layer 304 of fibers are spirally wound around the mandrel, over the inner liner 302, at an angle greater than 90° but preferably not in excess of 105° with respect to the longitudinal axis of the tubular body 102. Such winding angle assists in imparting the necessary torsional strength to the structural column required to overcome twisting forces acting on the erected structure. This winding angle, as well as the number of spirally wound layers having longitudinal layers interspersed therebetween, is variable as required to obtain the desired tensile strength, plus any safety margin, necessary to overcome the resultant stresses caused by pressurization.

Figure 4:
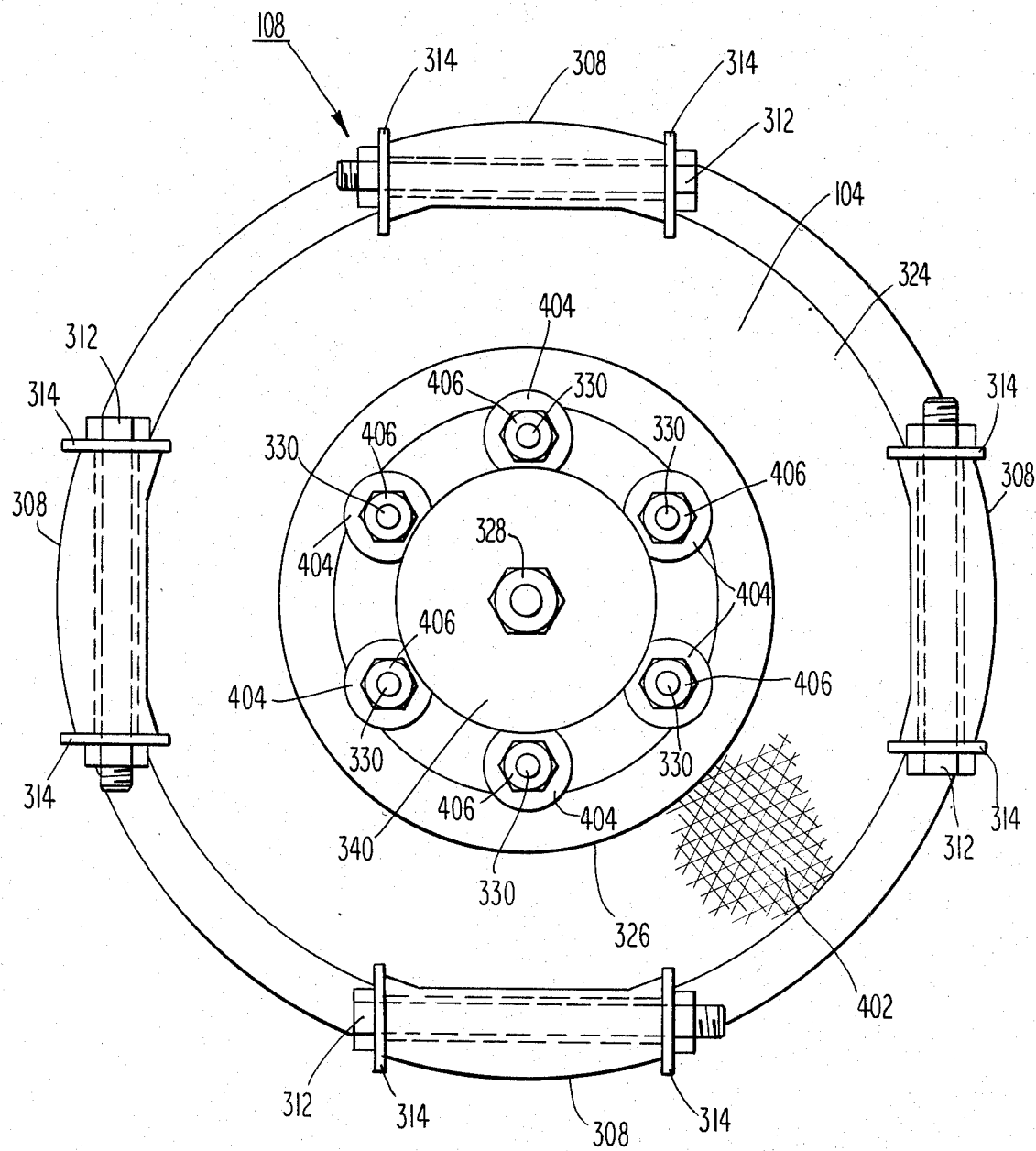
FIG. 4 is an end view of a first end of the structural column shown in FIG. 1.

After the inner layer 304 has been spirally wound, the layer 306 of longitudinal fibers is placed on top of the inner layer 304 by winding or by laying-up. These fibers are preferably oriented substantially parallel to the longitudinal axis of the tubular member 100 as previously stated. In addition to the aromatic polyamide fibers, it is preferred that uni-directional graphite tape or roving be disposed longitudinally about the circumference of tubular body 102 to serve as load paths for anchor members 308. The number and location of these anchor members can be varied according to intended use of the structural member 100. In the preferred embodiment, there are four anchor members 308 at each end of the tubular body 102, disposed equidistantly about the circumference thereof, as shown more clearly in FIGS. 4 and 5. Referring to FIGS. 3 and 4, the anchor members 308 are preferably constructed of graphite fiber and a fabric material which is preferably woven from duPont Kevlar "49" brand aromatic polyamide fibers. This fiber and fabric material is attached to the tubular body 102 by a bonding resin in the preferred embodiment. The graphite and fabric anchor members 308 are wrapped about a sleeve 310 through which an attachment bolt 312 is placed and to which are fastened link plates 314. It is preferred that the bolt 312 has a close dimensional tolerance with respect to the sleeve 310 in order to minimize relative movement between the two. The link plates 314 (see also FIGS. 1, 2 and 3) serve to connect the structural member 100 to another structural member in order to form the desired structure. The anchor members 308 primarily transfer tensile forces from the link plates 314 to the tubular body 102.

In addition to the link plate 314, sleeve 310, and bolt 312 configuration described above, additional link plates 316 may be added by means of slots cut through the sleeve 310 and anchor members 308 as shown in FIG. 3. When compressive forces act upon the sleeve 310 through attachment bolts 312 and link plates 314, they are directly transferred to the tubular body 102 through load bearing pads 318, each having a grooved seat 320 for receiving the sleeve 308. In the preferred embodiment, the pads 318 are constructed of epoxy impregnated duPont Kevlar "49" brand aramid fabric and are attached to the tubular body 102 by a bonding resin. The anchor members 308, sleeves 310 and pads 318 are incorporated into the ends of the tubular body 102 following construction of the tubular body 102 and the installation of the end cap structures 104 and 106.

Following the lay-up of the longitudinal fiber layer 306, the outer spiral wrapping 307 is performed. In order to enable the structure to be stored in a deflated, coiled form, the spirally wrapped and longitudinal fiber layers are impregnated preferably using resin systems or bonding agents which remain pliant and flexible during storage and transport to location of intended use. The structural members are then pressurized during initial erection in order to impart the desired shape and strength characteristics.

If desired, a light weight, outer liner 322 can be disposed over the filament core 202. It is preferable that this liner be constructed of metalized duPont Mylar brand plastic film. The outer liner 322 serves at least three purposes. First it will prevent disturbance or distortion of the filament core 202 due to possible contact with other objects prior to curing. Second, it will serve to help contain chemical fumes which may emit from the resin which impregnates the fibers. Third, it is useful in protecting the structure from ultraviolet radiation once assembly and curing has taken place. This outer liner can be removed if exposure to ultraviolet radiation is otherwise limited or if degredation of the material is limited by another protective method, such as addition of a reflective or light exterior coating of the column.

Referring again to FIGS. 3 and 4, the first end cap 104 includes a stationary end cap structure 324 and a removable end cap member 326. The removable end cap member 326 includes valving means 328 and is preferably attached to the stationary end cap structure 324 by means of a plurality of bolts 330. It is preferred that the stationary end cap 324 be formed on a mold having a mouth piece flange for defining an opening surrounded by an inwardly extended mouth piece flange 334 and that the end cap 324 be constructed of woven fabric, preferably duPont Kevlar "49" brand aramid fabric, impregnated with a resin system or bonding agent.

The stationary end cap structure 324 is preferably dome-shaped, having an inwardly extended portion 331. The structure 324 is bonded to an epoxy impregnated fabric tubular ring 332. This bonded assembly is then placed on the end of the mandrel and the tubular body 102 is thereafter wound around the mandrel and is bonded to the inwardly extending portion 331 of end cap 324. It is preferred that the tubular ring 332 be constructed of duPont Kevlar "49" brand aramid fabric. When mated with the stationary end cap structure 324, the tubular ring 332 extends from the end to the internal, pressurizable portion of the tubular body 102. It is preferred that the stationary end cap structure 324, the tubular ring 332 as well as the removable end cap member 326 be pre-cured. This causes the column ends to be rigid, thus maintaining a substantially circular shape which will not be distorted during initial inflation of the as yet uncured column. In performing this preferred assembly process, the mandrel is sufficiently collapsible to permit its removable from the tubular body 102 through the opening in the stationary end cap structure 324. In an alternate method of assembly, the tubular body 102 could be constructed on a non-collapsible mandrel, the mandrel then removed and the stationary end cap structure inserted into the end of the tubular body 102 and bonded thereto.

Referring now to FIG. 4, helically oriented fibers 402 on the stationary end cap structure 324 serve to counter stresses on the end cap structure resulting from pressurization. In addition, deformation of mouth piece flange 334 (see FIG. 3), when removable end cap member 326 is bolted in place, is lessened both by stiffness of the mouth piece flange 334 and by a circular stiffening ring 336 upon which the bolts 330 are seated. It is preferred that the bolts 330 are disposed around and in close proximity to the mouth piece opening defined by flange 334.

The removable end cap member 326 serves as an access to the interior of the tubular body 102 in the event that repairs or modifications are required as well as to permit removal of mandrel as previously described. The mouth piece flange 334 (see FIG. 3), which is formed in the stationary end cap structure 324, tapers slightly, with the opening sides becoming smaller when progressing from the exterior to the interior portion of the mouth piece flange 334. This provides for good seating and a pressure tight seal when the removable end cap member 326 is mated into the mouth piece flange 334. To further ensure a fluid tight seal, the surfaces of the mouth piece flange 334 are preferably individually and permanently coated with a layer 337 of a resilient, high adhesion elastomer such as rubber or neoprene, which layer 337 also covers the interior surfaces of the end cap structure 324. During installation of the removable end cap member 326, a bead of sealant 338 may also be added. This bead may be dislodged later for removal of the end cap member 326. An alternate preferred embodiment may include a threaded type of fastening means for attaching the removable end cap member 326 to the stationary end cap structure 324 instead of using bolts 330. In this alternate embodiment, the removable end cap member 326 would have threads for engaging mating threads on the mouth piece flange 334 of the stationary end cap structure 324.

Referring again to FIG. 3, the removable end cap member 326 comprises a dome-shaped portion 340 having a male insert flange 342 extending therefrom. The male insert flange 342 is dimensioned to fit snugly within the mouth piece flange 334 of the stationary end cap strucutre 324. It is preferred that the dome-shaped portion 340 and male insert flange 342 be constructed of an epoxy matrix of duPont Kevlar "49" brand aramid fiber fabric.

Referring to FIG. 4 there is shown an end view of the stationary end cap structure 324 and removable end cap member 326 installed therein. The dome-shaped portion 340 of removable end cap member 326 also includes the substantially circular stiffening ring 336 comprising a series of windings of a high strength fiber material, preferably epoxy impregnated graphite fibers. The stiffening ring 336, in conjunction with the male insert flange 342, minimizes deformation of the dome-shaped portion 340 when the removable end cap member 326 is fastened in place. It is preferred that graphite washers 404 be mounted within the circular stiffener 402. The graphite washers 404 have holes formed therein of suitable size to permit placement of the removable end cap member 326 onto the stationary end cap structure 324 and permit fastening thereto by means of bolts 330 and nuts 406.

As previously described, valve means 328 is sealingly mounted through the dome-shaped portion 340 of the removable end member 326. Valving means 328 enables the structural member to be inflated with a fluid, preferably air. The structural member of the present invention is preferably of a low pressure design, that is, from 30 to 150 PSI. The larger the diameter of the column in relation to its length, the less pressure is required to impart the necessary stiffness to the column for a given load.

Figure 5:
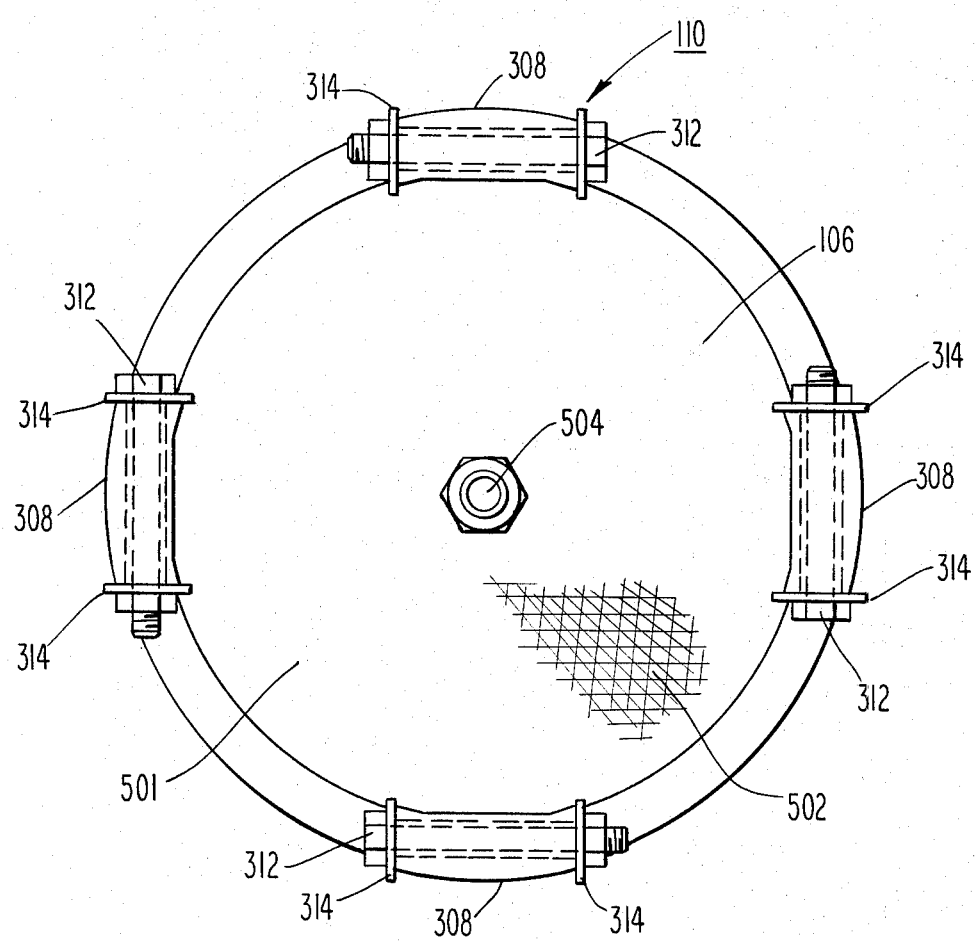
FIG. 5 is an end view of a second end, opposite the first end of the column depicted in FIG. 1.

Referring now to FIG. 5, there is shown the second end cap 106 which is disposed at the end of the tubular body 102 opposite to the first end cap 104. Construction of second end cap 106 is similar to that of the stationary end cap structure 324 of the first end cap 104 as previously described and shown in FIG. 3, except that the second end cap 106 contains no means for a later removal of a portion thereof. Once formed, cured and mated with the tubular body 102, second end cap 106 becomes a permanent part of the column structure.

The second end cap 106 includes a dome-shaped portion 501 and is preferably formed of epoxy impregnated duPont Kevlar "49" brand Aramid fabric and helical windings 502. A pressure check and relief valve 504 is sealingly disposed through substantially the center of the dome-shaped portion 501 of the end cap 106. The pressure relief valve 504 is preferably of standard manufacture and design which is understood by those skilled in the art to be used where regulation of fluid pressure is necessary. The pressure check and relief valve 504 serves two purposes. First, it prevents over pressurization of the column, which could result in possible catastrophic failure and reduced column strength through the resultant depressurization. Secondly, it also enables the maintenance of a sufficient pressure in a plurality of fluidically interconnected columns. By using the pressure check and relief valve 504 as shown in the preferred embodiment, the individual columns could be pneumatically as well as mechanically interconnected. The pressure check and relief valve 504 could be interconnected to the inflation valve 328 of an adjacent column by means of a pneumatic tube. By using this valving arrangement, rupturing and depressurization of one column would not lead to depressurization and concomitant diminished strength in all columns.

For example, if all mechanically connected columns were also pneumatically connected, these columns could be inflated by connecting the pressurization device, for example an air pump, to an end column. This column would be inflated until it reached the proper pressure, as controlled by its pressure check and relief valve. Since the pressure check and relief valve is pneumatically connected to the inflation valve of the adjacent column, continued pressurization of the first column would result in the inflation of the adjacent column. This series inflation of the interconnected columns would continue until the last column was inflated to the proper pressure whereupon, overpressurization would cause the last pressure check and relief valve to vent the pressurization fluid to the external environment. If one of the columns were to experience a leak, the check valve feature in the other columns would prevent them from venting their pressurization fluid into the leaking column. In addition, although a leak would cause the strength of the leaking column to diminish, the novel structure of these columns would provide enough residual stiffeners and strength to prevent catastrophic structural failure until the leak is repaired. The amount of residual strength and stiffness desired can be increased by adding more filament layers.

Figure 6:
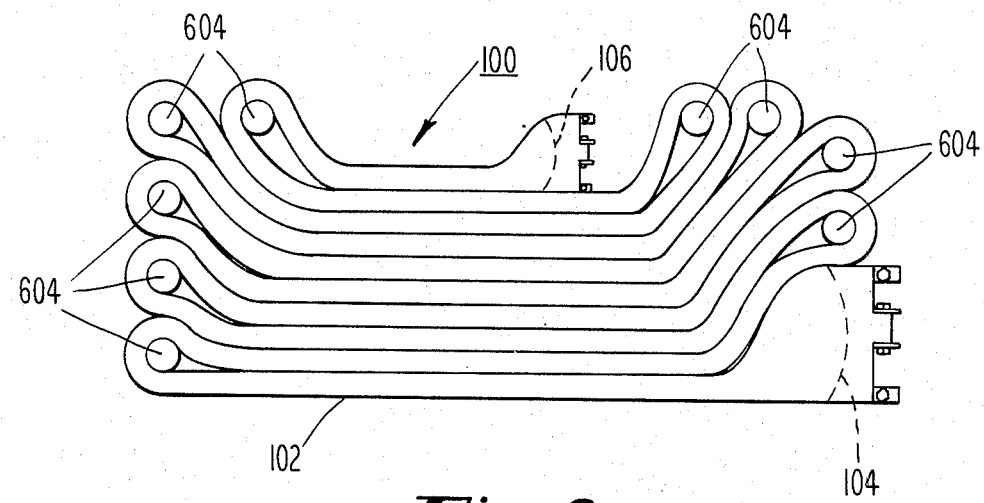
FIG. 6 is a side elevational view of a preferred configuration of a structural column of the present invention, stored prior to inflation.

Referring now to FIG. 6, there is shown an uninflated structural member 100 with its first 104 and second 106 end caps in place. In the preferred embodiment, the aramid fibers used to construct the tubular body 102 are impregnated with an epoxy resin which cures upon application of heat. During the storage and transportion of the structural members, the resin matrix is prevented from curing by storing the columns in a suitable container which permits the ambient temperature to be maintained at or below 0° centigrade. Following construction and application of the resin matrix material, the column, with the exception of the end caps 104 and 106, is flattened, or compressed in a configuration as shown in FIG 6. The uninflated column is then laid within a container which serves to protect the column and to maintain the low temperature by use of a cooling means. At points where the column is folded over upon itself, tubular spacers 604 are provided which are of sufficient diameter to prevent kinking of the tube which could result in a distortion of the structure. In addition to the embodiment shown in FIG. 6, an alternate preferred embodiment entails the flattening and spiral coiling of the column.

When ready for use, the collapsed column is removed from its storage container, gradually warmed and inflated and then the resin matrix is cured by the application of heat. The column is then mechanically and pneumatically connected to other columns as required by the particular structural design. Heat can be passively applied by exposure of the column to an ambient environment of the proper temperature, for example exposing the inflated column to solar radiation in extra-atmospheric or outer space environments. Heat can be actively applied by any appropriate heat generating means such as radiant electric heaters, hot air heaters, etc.

Although in the preferred embodiment previously described, the resin matrix is applied prior to storage and shipment, it is within the scope and contemplation of the present invention that the resin matrix can be applied and cured following inflation of the column at the use site. Using this alternate approach, it would not be necessary to store the collapsed columns at low temperatures.

As can be seen from the foregoing detailed description the structural column of the present invention offers both unique components and an unusual method of storage which results in great advantages over structures formed of columns of prior art designs, whether or not inflated by a fluid. There are many possible uses for a column which is light weight, yet rigid, and can be manufactured in relatively long lengths, yet can be stored in a greatly reduced space until ready for use, at which time it is transformed into a rigid, erect, permanent structure. One such application is the use of the columns of the present invention in erecting structures outside of the earth's atmospheres, such as orbiting structures or other planatary habitats.

While the principles of the invention have now been made clear in an illustrative embodiment, there will be obvious to those skilled in the art, many modifications of elements, components and arrangement thereof used in the practice of the invention and otherwise, which are particularly adapted for specific environments and operating requirements without departing from those principles. The appended claims are, therefore, intended to cover and embrace any such modifications within the limits only of the true spirit and scope of the invention.

I claim:

1. An inflatable support member comprising a substantially tubular body having attachment means on at least one end thereof, said tubular body being collapsible prior to introduction of inflating fluid and comprising:
    (a) a sealable inner liner impermeable to said inflating fluid;
    (b) at least one first layer of filaments spirally wound in a first direction at a first predetermined angle with respect to the longitudinal axis of said tubular body;
    (c) at least one second layer of filaments spirally wound in a second direction opposite said first direction, at a second predetermined angle with respect to said longitudinal axis;
    (d) a layer of longitudinally oriented filaments disposed between said first and second layers of filaments;
    (e) means for bonding said filaments together, said bonding means becoming stiff after curing; and
    (f) means for inhibiting the curing of said bonding means until after said support structure has been inflated.

2. An inflatable support member in accordance with claim 1 wherein said inflating fluid is a gas.

3. An inflatable support member in accordance with claim 2 wherein said gas is air.

4. An inflatable support member in accordance with claim 1 wherein said first predetermined angle is substantially between 91° and 105° and said second predetermined angle is substantially between 91° and 105°.

5. An inflatable support member in accordance with claim 1 wherein said filaments comprise aramid fibers.

6. An inflatable support member in accordance with claim 5 wherein said bonding means comprises a resin matrix.

7. An inflatable support structure in accordance with claim 6 wherein said means for inhibiting curing comprises means for maintaining the temperature of said collapsed tubular body below a predetermined temperature.

8. The inflatable support member in accordance with claim 7 wherein said temperature is substantially equal to 0° centigrade.

9. An inflatable support member comprising a substantially tubular body having attachment means on at least one end thereof, said tubular body being collapsible prior to introduction of inflating fluid and comprising:
    (a) a sealable inner lining impermeable to said inflating fluid;
    (b) at least a first layer of filaments spirally wound in a first direction at a predetermined angle with respect to the longitudinal axis of said tubular body;
    (c) at least a second layer of filaments spirally wound in a second direction, opposite said first direction at a predetermined angle with respect to said longitudinal axis;
    (d) at least one layer of longitudinally oriented filaments disposed between said first and second filament layers; and
    (e) means for bonding said filaments together after inflation of said tubular body, said bonding means becoming stiff after curing.

10. Inflatable support member in accordance with claim 9 wherein said inflating fluid is a gas.

11. An inflatable support member in accordance with claim 10 wherein said gas is air.

12. Inflatable support member in accordance with claim 9 wherein said first predetermined angle is substantially between 91° and 105° and said second predetermined angle is substantially between 91° and 105°.

13. An inflatable support member in accordance with claim 9 wherein said filaments comprises aramid fibers.

14. An inflatable support member in accordance with claim 9 wherein said bonding means comprises a resin matrix.

* * * * *